United States Patent [19]

Sims

[11] Patent Number: 4,941,789
[45] Date of Patent: Jul. 17, 1990

[54] APPARATUS FOR PREVENTING CROSS THREADING IN BLIND, HIGH PRECISION THREAD ENGAGEMENT

[76] Inventor: Charles Sims, P.O. Box 2787, Gulfport, Miss. 39505

[21] Appl. No.: 151,910

[22] Filed: Feb. 3, 1988

[51] Int. Cl.5 ............ F16B 33/00; F24H 1/00
[52] U.S. Cl. ..................... 411/369; 411/436; 411/533; 220/327
[58] Field of Search ............ 411/366, 427, 429, 436, 411/386, 533, 368, 369; 220/327, 328

[56] References Cited

U.S. PATENT DOCUMENTS

| | | | |
|---|---|---|---|
| 555,300 | 2/1896 | Browne | 411/429 |
| 1,930,103 | 10/1933 | Mechling | 220/327 |
| 2,454,962 | 11/1948 | Brown | 220/327 |
| 3,901,122 | 8/1975 | Novotny | 411/366 |
| 4,005,629 | 2/1977 | Franklin | 411/427 |
| 4,069,575 | 1/1978 | Sigmund | 411/366 |
| 4,717,299 | 1/1988 | Underwood | 411/533 |

*Primary Examiner*—Neill R. Wilson
*Attorney, Agent, or Firm*—Alexander F. Norcross

[57] ABSTRACT

In a high precision oil filter, a blind engagement of a threaded coupling with a supported shaft can be made without misalignment or cross threading in the coupling by providing, for a male threaded shaft having threads of a designed pitch and peak outer diameter, a mated female coupling having threads of the same pitch and size, and providing within the female coupling a cylindrical throat having an internal diameter equal to the peak outside diameter of the male coupling and a smooth cylindrical surface of a length at least equal to three times the thread pitch and preferably equal to five times the thread pitch.

2 Claims, 2 Drawing Sheets

APPARATUS FOR PREVENTING CROSS THREADING IN BLIND, HIGH PRECISION THREAD ENGAGEMENT

BACKGROUND OF THE INVENTION

This invention relates to a coupling of the blind screwdown type in which two objects are fastened together by engaging and screwing together a female coupling member onto a protruding male coupling member, each being provided with screw threads.

In the particular environment in which the preferred embodiment of the invention resides, the prior art device is a high precision oil filter having a removable filter insert disposed in an annular space between a cylindrical outer casing and a central pipe member.

The filter is provided with a removable lid to permit access to the filter elements for their inspection and replacement as needed during the life of the filter. The lid must, of course, be sealed against the pressure of the fluid being filtered, typically oil. For this reason, the lid is normally provided with precision gaskets to be compressed under pressure against the outer cylindrical surface and some means of fastening, against internal pressure, the lid to the cylindrical filter body.

Any fastening means chosen must be usable by typical operational personnel or semi-skilled mechanical personnel who in the field normally are the persons who inspect and change the oil filter at intervals. It is found that this type of servicing task is typically handled by semi-skilled personnel, and any fastening means chosen must be safe, effective and reliable when used by persons of little intrinsic skill. Further, the method of fastening must be intuitively obvious, as the typical servicing person cannot be expected to either be highly trained in the operation of the filter or to exhibit a great deal of skill in determining whether the filter is properly reassembled.

For this reason, the filter fastening means chosen is almost inevitably some form of heavy threaded screw fastener. A first typical type of fastening is the use of a hinge and wing nut permitting the lid to be tilted open or fastened down by a wing nut on a threaded fastener. For a number of reasons, including possible loss of the wing nut, substitution of unsuitable substitute nuts, and the difficulty of insuring adequate torque against the internal pressure, this is a less successful expedient, and the preferred method of fastening involves screwing the lid on a threaded central post within the filter so as to provide a symmetrical, uniform hold down force.

This type of fastening, however, is a blind fastening. The lid obscures the vision of the engagement of the screw thread and the central pipe and the engagement of the threads is typically by feel. Since the intuitive response of a person engaging two threads to fasten an object together is to tighten the object until a certain amount of resistance (back torque) is felt, and then assume that the fastening has been correctly engaged provided the lid does not easily pull off, there is a high potential for cross threading. As one example, filter inspection by factory personnel of returned filters of the type used for the preferred embodiment indicated that substantially all the filters showed evidence, particularly scarring around the fastening handle base by pipe pliers, of excessive torques being applied to overcome a cross threaded fastening and secure the filter lid. Inspection of the internal fastening threads likewise indicated a substantially high incidence of cross threaded engagement which is destructive to the threads and ultimately destructive to the filter.

Furthermore, repeated cross threading of a filter weakens the joint to the point where actual filter lid failure can occur causing a possible explosion of the filter, sudden loss of filtered oil and resulting severe damage to the object whose oil is being filtered. Since the typical large oil filter is utilized on unattended continuously running machinery, such as diesel engines and the like, the potential for an undetected sudden filter failure, with resulting loss or destruction of the prime mover poses an unacceptable risk.

Previous attempts to provide a form of alignment between the mating male and female threaded fasteners for blind engagement have proven relatively unsuccessful; these include attempting high precision machining of the lid to provide for high tolerance alignment of the joint; providing a V-grooved angular ring circumferentially around the outer edge of the lid so that the lid is brought into identical alignment with the cylindrical outer body of the filter, and chamfering and countersinking the female fastening to provide a guide for the male fitting.

In each case it has been found that, in any structure that provides a suitable amount of freedom of motion of the female fitting so as to align and secure the lid and provide sufficient freedom of engagement, cross threading still occurs with an unacceptable degree of frequency.

SUMMARY OF THE INVENTION

Within a high precision oil filter of the pressurized type, having a removable lid, with blind engaging threaded fastening coupling for screw threaded engagement with a provided central male threaded pipe member, it has been found that correct alignment of the male and female members may be achieved in the blind coupling provided that for an initial distance along the interior of the female coupling greater than the linear distance of four thread pitches, preferably as long as the distance of six thread pitches of the male member, a smooth, coaxially aligned, cylindrical entry way is provided leading into the female threaded area, of a diameter equal to the peak diameter of the male threaded members.

It has been found that so long as the cylindrical entry way is at least of the length above stated, that blind thread engagement by people of limited skill, using only tactile feedback, successfully and consistently provides for a non-cross threaded, first time spin up engagement of the male and female threaded members. By contrast, it has been found that where the entry way is not provided or is of a length of less than four thread pitches, cross threading occurs at an unacceptable frequency.

Further, since cross threading is not normally distinguished by persons of normal skill from a successful engagement, such cross threading appears to be a proper engagement and is only revealed upon subsequent failure of the joint.

It has also been determined that, by providing an entry way of the inventive type disclosed here, blind threaded engagement can be achieved in a hand fastened screw thread at an acceptable degree of force and that maintenance abuse, using wrenches or breakers bars to provide an excessive fastening torque in an attempt to fasten the lid, is substantially eliminated.

It is, thus, an object of this invention to disclose a structure within a mating male and female threaded coupling for successfully accomplishing blind engagement of the coupling substantially without risk of cross threading or jamming.

It is a further object of the invention to show a form of coupling suitable to a blind fastened pressure lid or liquid pressure container which is substantially without risk of cross threading and an improper, false indication of engagement.

This and other objects of the invention may be clearly seen from the detailed description of the preferred embodiment which follows.

DETAILED DESCRIPTION OF THE PREFERRED EMBODIMENT

Figure 1:
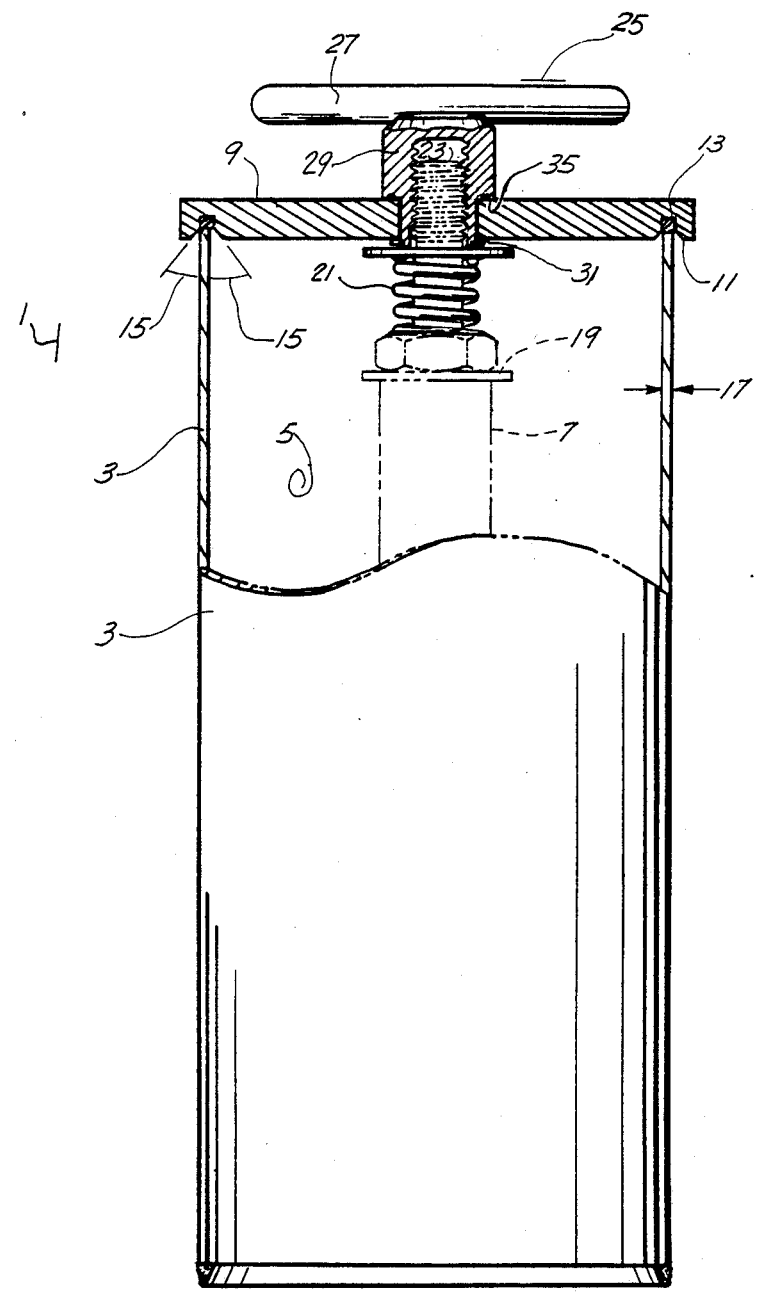
FIG. 1 is a cross sectional view of the prior art high pressure oil filter of the preferred embodiment, showing the form of the threaded coupling in sections.

FIG. 1 shows, in partial sectional detail, the outer cylindrical casing or body of filter 1 of the type generally known as a paper towel filter. This filter has had the filter element removed for clarity in order to detail the mechanical structure of the filter body, but it is understood that a cylindrical, annular filter medium is inserted within the filter housing 3 in the annular space 5 between the filter housing 3 and filter center post 7.

Filter details, such as the actual flow of liquids within the filter and fluid passage into and exiting from the filter 1 are deliberately omitted for clarity, but are well understood by those of skill in the prior art. Numerous expedients are known in regard to the flow of liquid through the filter medium in order to provide for maximum filtration.

In all cases, however, the actual process of filtration involves the injection, under pressure, and containment of a contaminated liquid under pressure. For a high quality filter, such as the filter of the preferred embodiment of the invention, the very restricted flow capabilities of the filter medium, necessary for the removal of very fine particulates, requires a significant pressure differential across the filter medium, and, thus, results in a very high pressure head being generated interior to filter 1.

It is well known that the filter medium within the filter must be periodically removed and replaced, so as to remove the entrapped contaminants. For this reason, the filter 1, while it is required to be sealed tightly against significant internal pressure, must have a mechanism allowing it to be opened for the insertion of filter medium. This is provided by the filter housing lid 9.

Lid 9 in the preferred embodiment of the invention may be seen to be a disc, in the preferred embodiment of a high tensile strength steel. This disc is provided with an annular filter groove 11 in which an annular filter seal ring 13 is countersunk. In order to provide a tight sealing contact between the upper end of filter housing 3 and lid 9, the shape of the annular filter groove 11 is preferably provided with beveled angle 15 designed to guide a center lid 9 onto the top of filter housing 3. In the preferred embodiment of the invention, bevel 15 narrows to a rectangular groove essentially of the same thickness as that of the walls 17 of filter housing 3 within which is set a recessed seal ring 13.

Further, in order to provide for adequate sealing against fluid leakage around the filter medium, a pressure sealing means 19 is driven by means of reciprocating spring force through spring 21 which is compressed by the placement of lid 9 over securing pipe member 23.

The purpose of spring 21, as is well understood in the art, is to provide, when lid 9 is secured, a smooth downward force against a pressure sealing means 19, which is required to prevent bypass leaking down the outer surface of center post 7 between center post 7 and the filter medium. Various forms of knife edge and high tolerance internal seals are known to be used for means 19, all of which are well understood by one of skill in the art in filters. However, all such seals require some form of compressive force to be exerted to effect sealing when the filter housing is closed.

Figure 2:
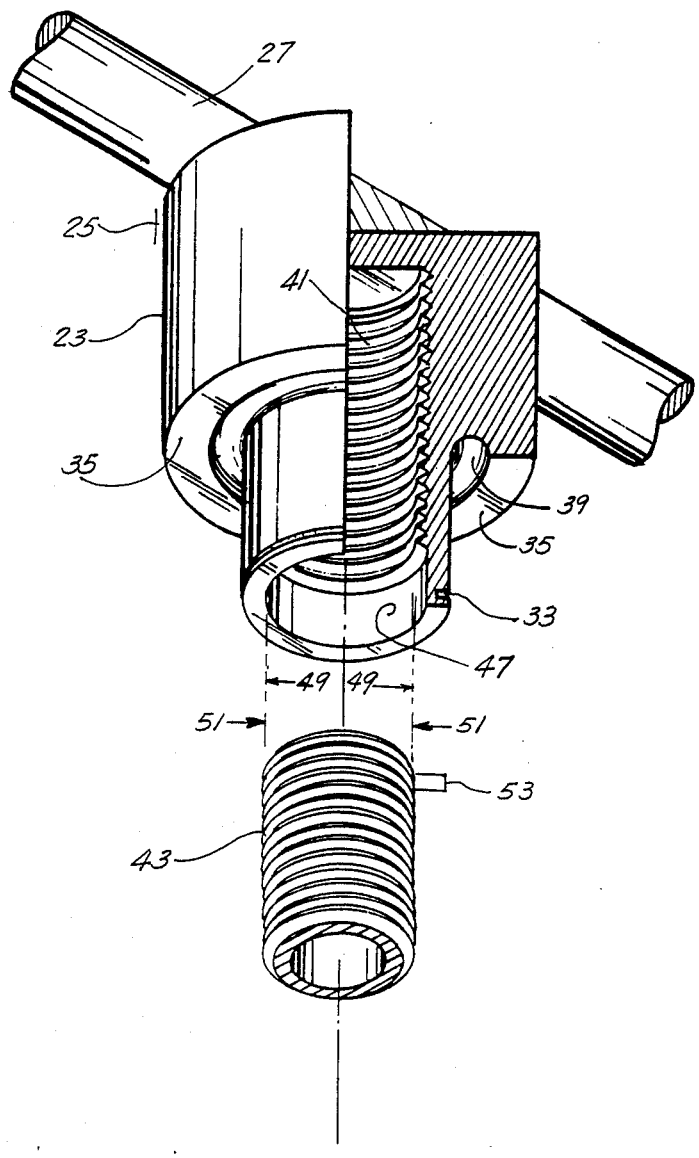
FIG. 2 is a sectional view of the female member of the threaded coupling showing the invention.

Lid 9 is secured against filter housing 3 by means of a screwdown means 25 which may be seen in more detail in FIG. 2.

Screwdown means 25 consists of T-handle 27 extending above lid 9 and adapted for easy manipulation by a user, fixedly affixed, typically by welding to receiving cap screw 29.

Receiving cap screw 29 must be journaled with a centrally disposed hole within lid 9 so as to be coaxial with center post 7, and center post securing pipe member 23, extending vertically therefrom. In order to provide for a threading effect so as to secure lid 9 against the force of spring 21 and sealingly against filter housing 3, cap screw 29 must rotate within and with respect to lid 9. This rotation, however, must not permit leakage under the high pressures to be encountered within the operating filter 1 through the gap between cap screw 29 and lid 9.

In order to prevent such leakage, cap screw 29 is received within lid 9 with a high tolerance interference fit. A provided split ring 31 fitting into a mating split ring groove 33 secures cap screw 29 within lid 9. Cap screw 29 is provided with sealing shoulder 35 which radially bears upon the outer surface of lid 9. Within a sealing annular disposed upon the face of sealing shoulder 35 is cap screw sealing ring 37.

Sealing ring 37 is a standard O-ring, but differs from typical practice in that it is recessed by increasing the depth of cap screw sealing ring groove 39 for 92 to 95 percent of the overall depth of sealing ring 37. Sealing ring 37 is a standard oil resistant O-ring, but as installed within groove 39, only 5 percent of the thickness of O-ring 37 is exposed. This is found to substantially eliminate scuffing and failure of O-ring 37 produced by the relative rotation of cap screw 29 and lid 9.

Cap screw 29, through a downward force on sealing shoulder 35, exerts the entire clamping force retaining lid 9 onto housing 3 when pressure is applied within filter 1. Therefore, it is necessary that the strength of cap screw inner thread 41, when screwingly engaged with securing pipe member 23's outer thread 43, provide a substantially strong interconnection transferring all pressure forces exerted upon lid 9 into tension forces along center post 7, which can be readily designed to resist such forces in tension.

It has been found that the usual standard thread pitches are not sufficiently strong or precise for this service, and, thus, for a typical oil filter using a 11/16 inch securing pipe member 23, a special thread known as 11/16-16 is used to provide an adequate strength.

The centering of lid 9 onto filter housing 3 and its positive, leak-tight interconnection depends upon the correct and proper engagement of cap screw 29 and securing pipe member 23. It can readily be seen, however, that this is a blind engagement in terms of accurately aligning the threads together so as to provide for a lack of cross threading and an accurate fit. It has been determined in use of prior art structures of the form herein described that both chambering and partial countersinking of the receiving throat 45 of the cap screw 29 have been insufficient to prevent cross threading. This is shown by the fact that it has been common to find that excessive forces have been exerted on cap screw 29 in an effort to tighten lid 9 in a cross threaded position. Scarring damage found on cap screw 29 is evidence of the use of very large wrenches to apply excessive torque, produces a superficially tight fastening, in that cap screw 29 appears to be sufficiently fastened against back hand torque upon T-handle 27.

Nonetheless, as is commonly known, a cross thread connection lacks the strength of a properly threaded connection of inner threads 41 and outer threads 43. At best, the damage to the threads from the repeated cross threading produces gradual degradation and subsequent failure; at worst, it produces sudden failure of the interconnection of cap screw 29 and sealing pipe 23 allowing the filter lid 9 to fly open.

Since the typical use of filter 1 is an unattended fuel or oil filter upon a constantly utilized prime mover, such failure is not often immediately detected and often results in total failure of the prime mover from fuel starvation or oil starvation before filter failure has been detected.

It has been determined that providing receiving throat 45 with a coaxial smooth counter bore, coaxial with inner thread 41, but having a substantially uuniform inner diameter 49 which is, to a high tolerance fit, equal to the maximum outer diameter 51 of outer thread 43, and providing said counter bore for a depth within cap screw 23 greater than the vertical distance of four thread pitches of outer thread 43 and preferably equal to six thread pitches of outer thread 43, that the incidence of cross threading is eliminated.

While the upper edge of securing pipe member 23 and the entry to the counter bore 47 may be provided with a slight chamfer, this chamfer does not affect the presence or absence of cross threading within the disclosed structure. Rather, it appears that so long as the provided counter bore extends for at least the minimum distance stated with respect to the thread pitches being engaged, that the previous incidence of cross threading is eliminated.

By comparison, a counter bore of less than four thread heights exhibits as high a rate of cross threading in practice as where no counter bore whatsoever exists and is indistinguishable from a non-counter bored thread or a thread engagement having only entry chamfers, the most typical prior art structure for aligning a male and female threaded member for a blind fit.

It is, thus, apparent from the description of the invention given that I have disclosed a useful and significant improvement in the engagement of blind fit male and female threaded member of wider application than my lid securing cap screw for a pressurized oil filter. It should, thus, be apparent that the invention, while narrow in form, is wide in scope of application, and is, thus, not restricted to the specific filter application given, but rather to that wider range of uses as may be evident from the claims.

I claim:

1. In a lid for blind fastening to a container, a self-aligning fastening means further comprising:
   (a) a first threaded male cylindrical member within said container, approximately coaxially aligned with an axis of said container;
   (b) a second female fastening member with said lid adapted for rotation with respect to said lid;
   (c) said second female fastening member being received within said lid in a high tolerance fit;
   (d) said female member extending a distance interior to said lid against resistance of a spring means;
   (e) said male member and said female member further comprising:
      (1) said male member defining a thread pitch having a thread to thread linear pitch distance and a thread peak to thread peak diameter;
      (2) said second female member having a mating famale thread having a thread pitch distance and an internal thread diameter mating to the thread on said male member;
      (3) said famale thread defining a coaxial bore within said female member extending from an entry face of said famale member internally a distance into said female member;
      (4) said coaxial bore defining an axis of said female member;
      (5) a first cylindrical countersunk section within said bore, coaxial with said member axis, intermediate said entry face and said female thread;
      (6) said countersunk section being of a diameter substantially equal to but not substantially greater than said thread peak diameter;
      (7) said bore being of a length greater than four times said thread pitch distance.

2. In a circular lid for blind fastening to a container having a screw threaded hold down disposed along a center of said lid, said hold down being blind engagement, the manipulation of which is controlled by the positioning of said lid, said lid being separately aligned; the self-aligning screw fastening means further comprising:
   (a) a first threaded male cylindrical member within said container, coaxially aligned with an axis of said container;
   (b) a second female fastening member captively held within said lid adapted for rotation with respect to said lid;
   (c) said second female fastening member being captively held in a high tolerance fit;
   (d) said male member and said female member further comprising:
      (1) said male member defining a thread pitch having a thread to thread linear pitch distance and a thread peak to thread peak diameter;
      (2) said second famale member having a mating female thread having a thread pitch distance and an internal thread diameter mating to the thread on said male member;
      (3) said female thread defining a coaxial bore within said female member extending from an entry face on said famale member internally a distance into said female member;
      (4) said coaxial bore defining an axis of said female member;
      (5) a first cylindrical countersunk section within said bore, coaxial with said member axis, intermediate said entry face and said female thread;
      (6) said countersunk section being of a diameter substantially equal to but not substantially greater than said thread peak diameter;
      (7) said bore being of a length greater than four times said thread pitch distance.

* * * * *